(12) United States Patent  
Powers (10) Patent No.: US 12,529,238 B2  
(45) Date of Patent: Jan. 20, 2026

(54) SYSTEM TO FACILITATE PARKING A VEHICLE STRAIGHT IN A DESIRED LOCATION INSIDE A GARAGE

(71) Applicant: Robert William Powers, Silver Spring, MD (US)

(72) Inventor: Robert William Powers, Silver Spring, MD (US)

( * ) Notice: Subject to any disclaimer, the term of this patent is extended or adjusted under 35 U.S.C. 154(b) by 0 days.

(21) Appl. No.: 18/475,656

(22) Filed: Sep. 27, 2023

(65) Prior Publication Data

US 2025/0101763 A1    Mar. 27, 2025

(51) Int. Cl.
*E04H 6/42* (2006.01)

(52) U.S. Cl.
CPC ................... *E04H 6/426* (2013.01)

(58) Field of Classification Search
CPC ........................................... E04H 6/426
See application file for complete search history.

(56) References Cited

U.S. PATENT DOCUMENTS

| | | | | |
|---|---|---|---|---|
| 1,429,166 A * | 9/1922 | Rommer | ................ | B62D 15/02 |
| | | | | 116/28 R |
| 3,199,487 A * | 8/1965 | Heinkel | ................ | B60Q 1/48 |
| | | | | 116/28 R |
| 3,859,732 A * | 1/1975 | Davin | ................ | G01C 3/22 |
| | | | | 33/264 |
| 4,813,758 A * | 3/1989 | Sanders | ................ | E04H 6/426 |
| | | | | 116/28 R |
| 5,500,773 A * | 3/1996 | Easter | ................ | B60R 1/06 |
| | | | | 359/838 |
| 5,655,474 A * | 8/1997 | Pretsch, Jr. | ................ | B60Q 1/48 |
| | | | | 116/28 R |
| 6,199,287 B1 * | 3/2001 | Rankila | ................ | B60Q 1/48 |
| | | | | 116/28 R |
| 6,631,565 B2 * | 10/2003 | Wu | ................ | H01J 9/261 |
| | | | | 33/645 |
| 6,776,117 B2 * | 8/2004 | D'Onofrio | ................ | E04H 6/426 |
| | | | | 116/28 R |
| 7,124,705 B2 * | 10/2006 | Randhawa | ................ | G01C 3/22 |
| | | | | 116/28 R |
| 7,543,545 B2 * | 6/2009 | Matsumoto | ................ | B60R 19/48 |
| | | | | 116/28 R |
| 7,926,192 B1 * | 4/2011 | Dordick | ................ | G06F 1/1607 |
| | | | | 33/286 |
| 8,466,808 B2 * | 6/2013 | Ghatak | ................ | E04H 6/426 |
| | | | | 340/5.71 |
| 9,995,566 B1 * | 6/2018 | Wacker, III | ................ | F41G 1/00 |
| 2002/0174822 A1 * | 11/2002 | Royal | ................ | B60R 1/02 |
| | | | | 33/645 |

* cited by examiner

*Primary Examiner* — Kristina M Deherrera
*Assistant Examiner* — Tania Courson
(74) *Attorney, Agent, or Firm* — Michael L. Greenberg, Esq.; Greenberg & Lieberman, LLC (57) ABSTRACT

An apparatus to be viewed by a driver to aid parking their car parallel to the walls of their garage. The driver will be able to park in exactly the same spot each time, at the desired distance from other cars, walls, or other stationary objects. This will help minimize banging car doors on objects on opening while maximizing use of space within the garage. The apparatus is installed in a fixed position in front of the driver at eye level as they sit comfortably in the driver's seat of their vehicle. As the driver drives their car into their garage to park, they are guided by visual cues from the apparatus to park the car in the same footprint on the floor each time.

6 Claims, 7 Drawing Sheets

SYSTEM TO FACILITATE PARKING A VEHICLE STRAIGHT IN A DESIRED LOCATION INSIDE A GARAGE

FIELD OF THE PRESENT INVENTION

The present invention relates to the field of consumer vehicles, and more specifically relates to a system and apparatus which facilitates the consistent parking of a vehicle straight in a desired location of a garage. The desired location is preferably parallel to adjacent walls and vehicles while minimizing wasted space within the garage.

BACKGROUND OF THE PRESENT INVENTION

Homeowners who have single or multi-car garages have long had a problem with parking their vehicles in precisely the same spot every time. If the vehicle is too close to objects on either side, it will be difficult to open the vehicle doors as far as possible, resulting in hitting the adjacent objects or another car, or preventing the door from being opened wide enough to allow a comfortable exit from or entrance to the vehicle.

Unfortunately, other products on the market, such as suspended tennis balls, stop signs that light up when touched, or rubber wheel stoppers, only prevent the driver from pulling too far into the garage, but do not help keep the vehicle aligned side-to-side. If there were a novel device which could provide a clear visual cue to the driver without employing electricity, which could inform the driver as to whether the vehicle is centered in a desired position of the garage, parking accuracy could be expedited and space in the garage could be maximized.

Thus, there is a need for a new device configured to quickly and easily inform the driver as to their present approach angle to a desired spot within a garage. Such a device is preferably configured to be mounted to a wall or stationary object in the garage in a precise location. The device is preferably equipped with at least one stripe, which, when shown in alignment with its surroundings, is configured to indicate the lateral and/or angular position of the vehicle such that the driver may make corrections to the vector of the vehicle before entering the garage too far, and therefore requiring the driver to re-park the vehicle.

SUMMARY OF THE PRESENT INVENTION

The present invention is a passive visual aid for a driver to help them park their vehicle in precisely the same spot in their garage each time. It consists of two thin, flat, rectangular pieces of material which are affixed together at each corner by columns of material that separate the two pieces by a short distance and holds them parallel to one another. Each piece is colored with a light background, and each has a thin brightly colored vertical stripe across the center. The two colors preferably contrast as much as possible, and the stripe should be wide enough and the pieces large enough that they can be seen easily by the driver as they drive into the garage.

The front piece has a hole in it, allowing the back piece to be visible through the hole. If the driver sees a single continuous bright line as they drive into the garage towards the device, then they are assured of parking their vehicle in the desired location. If, however, the driver sees a broken or disconnected line as they drive towards the device, the vehicle position will not be correct, and can be adjusted by turning the vehicle slightly one way or the other until a single continuous line is seen.

The following brief and detailed descriptions of the drawings are provided to explain possible embodiments of the present invention but are not provided to limit the scope of the present invention as expressed herein this summary section.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

The present invention will be better understood with reference to the appended drawing sheets, wherein.

DETAILED DESCRIPTION OF THE PREFERRED EMBODIMENT

The present specification discloses one or more embodiments that incorporate the features of the invention. The disclosed embodiment(s) merely exemplify the invention. The scope of the invention is not limited to the disclosed embodiment(s).

References in the specification to "one embodiment," "an embodiment," "an example embodiment," etc., indicate that the embodiment described may include a particular feature, structure, or characteristic, but every embodiment may not necessarily include the particular feature, structure or characteristic. Moreover, such phrases are not necessarily referring to the same embodiment, Further, when a particular feature, structure, or characteristic is described in connection with an embodiment, it is submitted that it is within the knowledge of one skilled in the art to affect such feature, structure, or characteristic in connection with other embodiments whether or not explicitly described.

Figure 1:
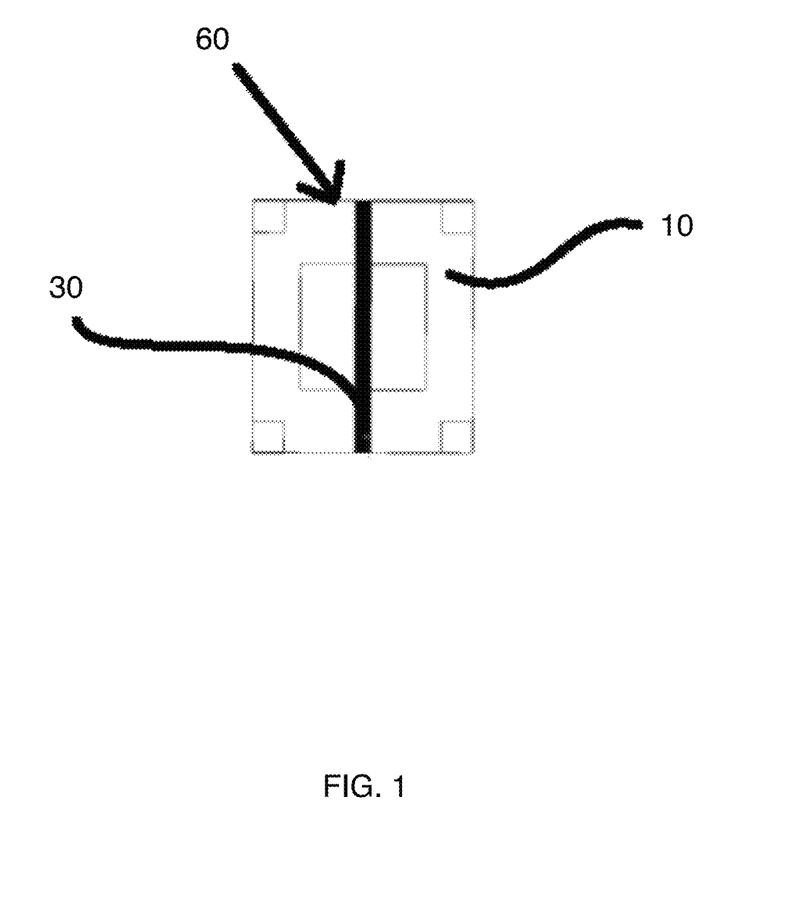
FIG. 1 details a view of a preferred embodiment of the apparatus of the present invention as seen from the front as shown when the vehicle is parked at the correct angle, denoted by the solid line.
Figure 2:
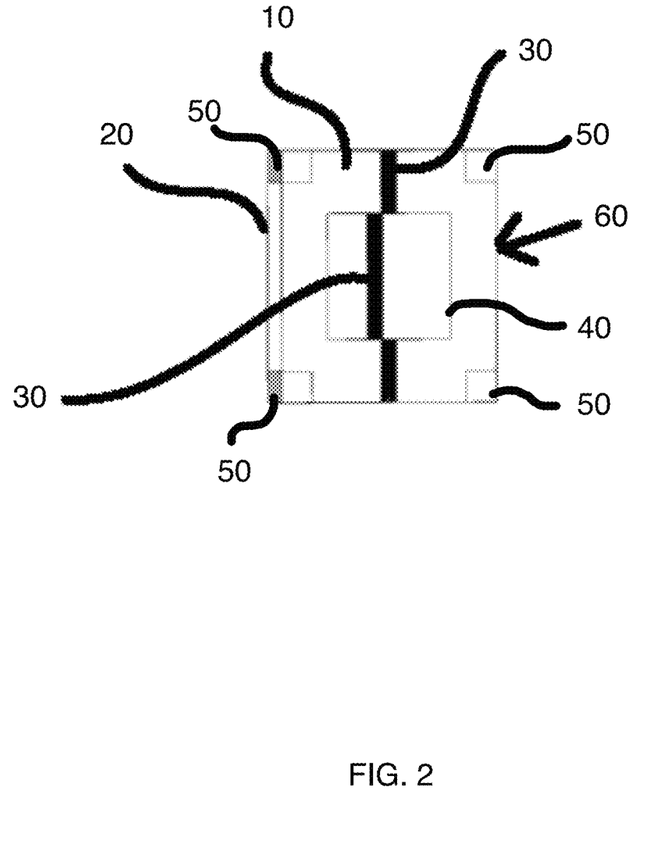
FIG. 2 exhibits a view of the apparatus of the present invention as seen by the driver when the angle of the vehicle is incorrect and therefore the final parking location will be too far to one side or the other of the garage as noted by the broken line.
Figure 3:
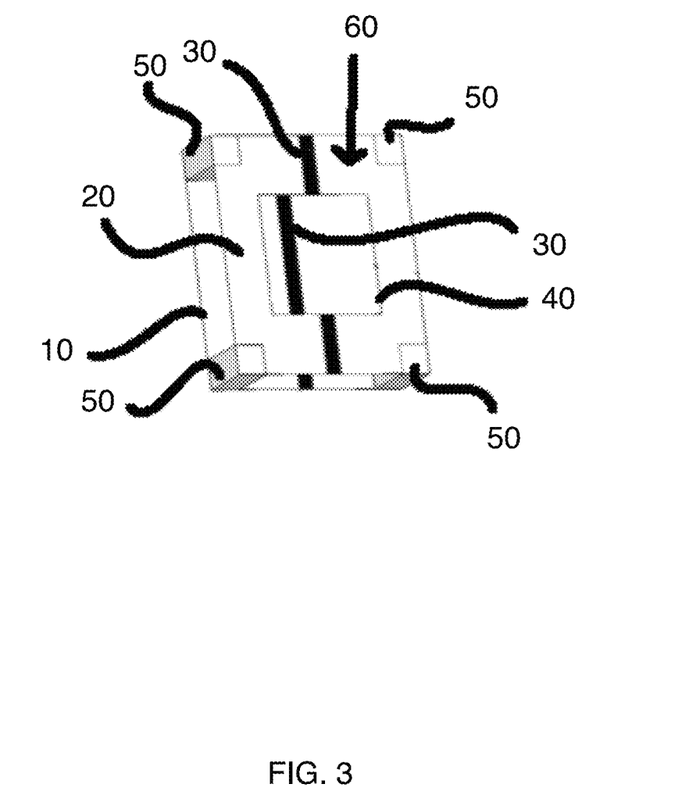
FIG. 3 shows an oblique view which details how the apparatus of the present invention is constructed.

The present invention is a visual aid device (60) configured to help a driver park their vehicle in the same spot in their garage each time as shown in FIGS. 1-3.

Referring to FIG. 3, the present invention is equipped with a front panel (10) and back panel (20) which are both preferably made of thin plastic, and is approximately 6"×6" square. It should be noted that the front panel (10) constitutes a first planar surface, and the back panel (20) constitutes a second planar surface. Both the front panel (10) and back panel (20) are preferably colored white, and are equipped with a bright red stripe (30), ½" wide, painted vertically in the center, on top of the white.

The front panel has a 4"×4" square hole (40) cut through the middle of it, so the back panel can be seen behind it.

Columns (50) are preferably present between the front panel (10) and the back panel (20), separating the panels from one another while connecting them together. The columns (50) attaching the front panel (10) and rear panel (20) together are preferably 1"×"1 square, 2" long, and made of plastic or cardboard.

The present invention should be used in conjunction with commercially available parking wheel stops or bumpers, so the vehicle can be parked in the correct forward position as well as the correct position side-to-side aided by proper use of the present invention.

Figure 4:
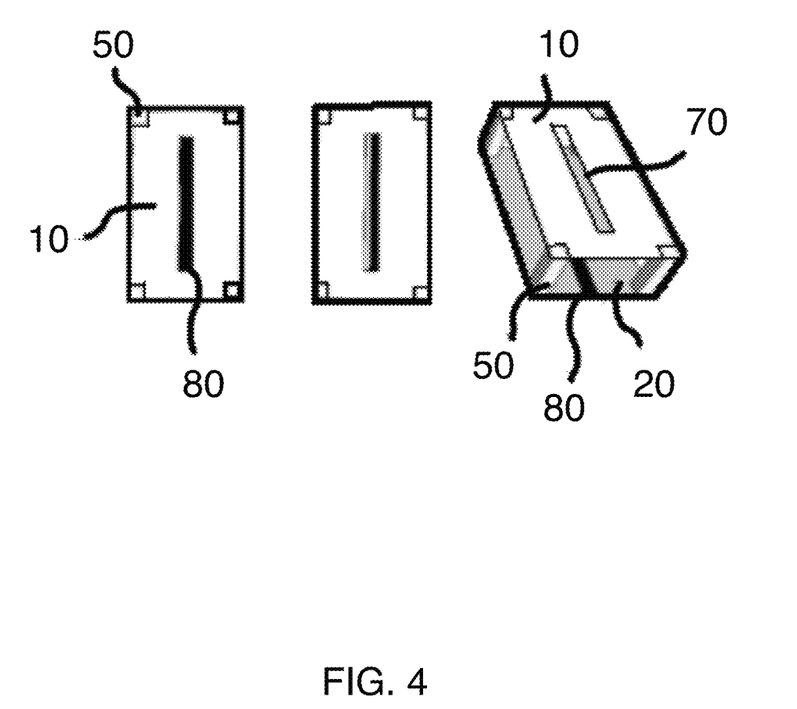
FIG. 4 shows an alternate embodiment of the present invention which is equipped with a slit disposed through the front surface.

Alternate embodiments, primarily reflecting the design of the present invention, preferably include:

1. A second embodiment equipped with a vertical slit (70) in the front panel (10) (see FIG. 4). The front panel (10) in this embodiment is preferably light in color, and the back panel (20) is a dark color with a contrasting dark stripe (80) positioned in such a way that when the vehicle is correctly parked only the contrasting dark stripe (80) will be visible through the slit (70), otherwise both dark colors, or only the secondary dark, background color will be visible.

Figure 5:
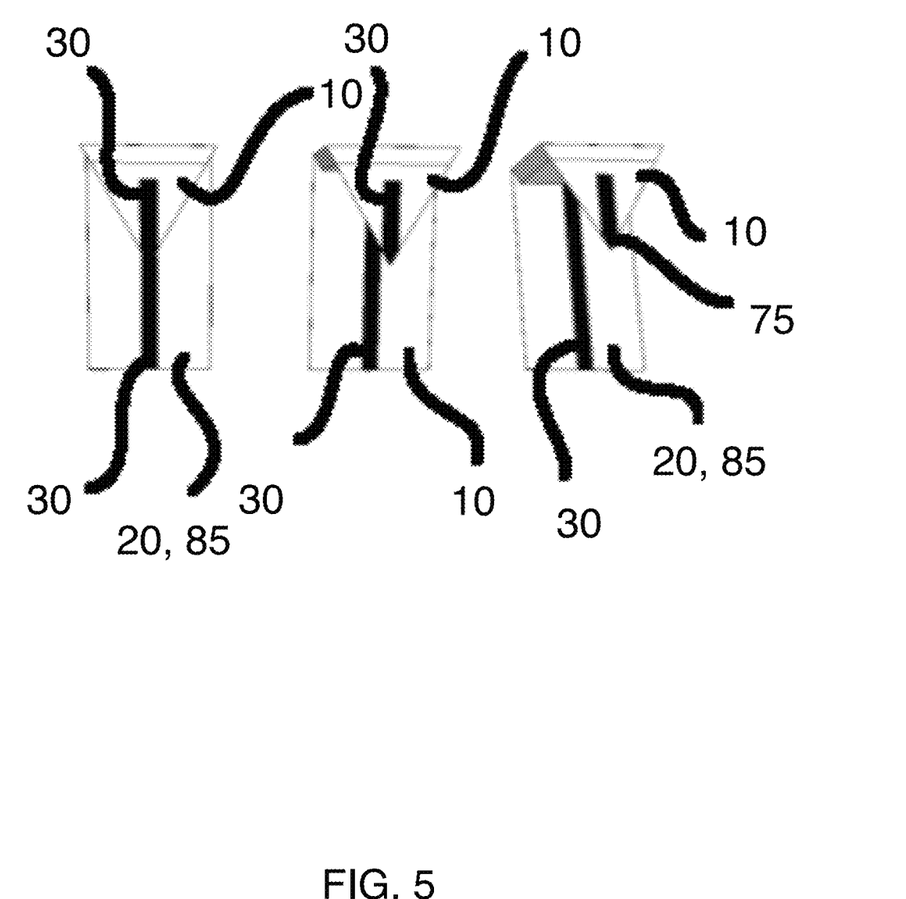
FIG. 5 depicts an alternate embodiment of the present invention which is equipped with an overhanging pointer.

2. A third embodiment in which a light-colored top panel (10) is shorter than a light-colored bottom panel (20) as shown in FIG. 5, with a bright vertical stripe (30) running through both in such a way that when the vehicle is correctly parked the two vertical stripes will appear as one, otherwise the stripe will look uneven or there will be two separate stripes. In contrast to the preferred embodiment of the present invention, a floating point (75) is used as a contrast against a rear mounting plate (85) as shown in FIG. 5.

Figure 6:
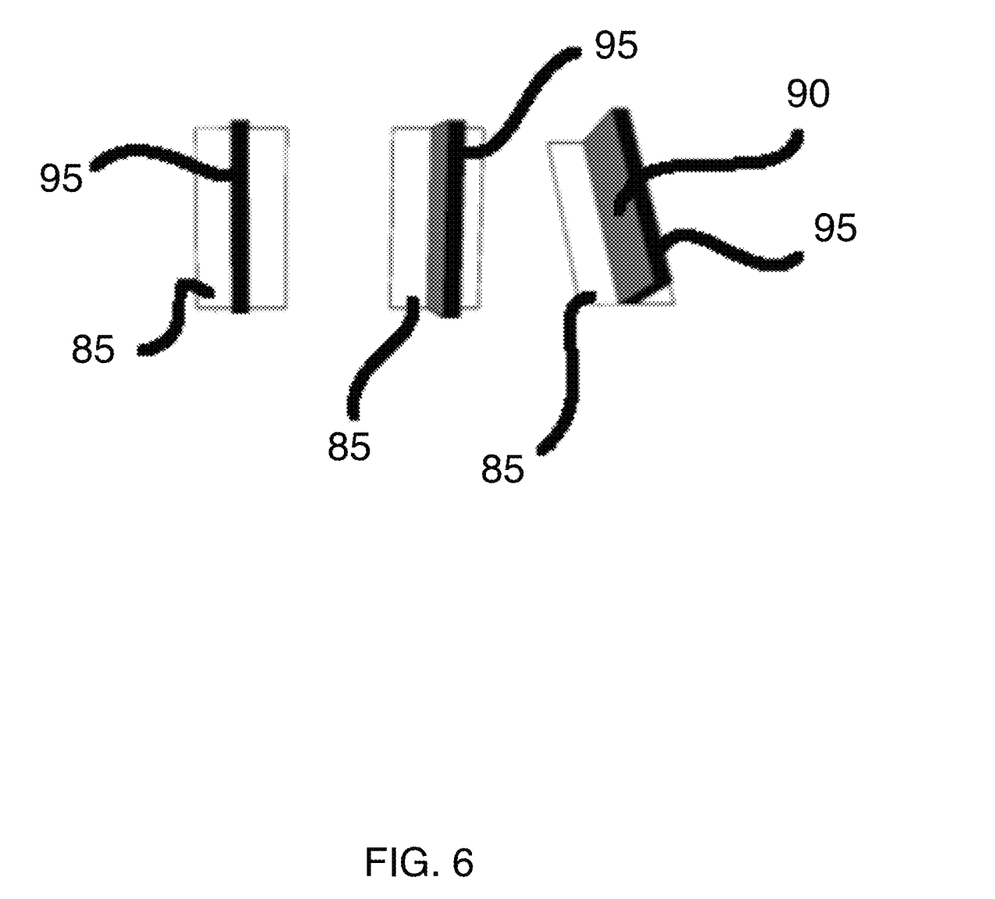
FIG. 6 exhibits an alternate embodiment which is equipped with a single perpendicular plane.

3. A fourth embodiment which is equipped with a single vertical plane (90) as shown in FIG. 6. The single vertical plane (90) is disposed perpendicularly to a rear mounting plate (85) which is configured to be mounted to the wall or stationary object in the garage. The single vertical plane (90) is brightly colored on a front edge (95) and is thick enough that the one brightly colored front edge (95) can be easily seen from the entrance to the garage. The plane is mounted vertically, with the bright front edge (95) facing the driver at eye level. The rest of the vertical plane (90) is a contrasting dark color such that, when the vehicle is correctly parked, only the brightly colored front edge will be visible, otherwise the contrasting dark color of the rear mounting plate (85) will also be visible. The plane is attached perpendicular to a light-colored backing board, which itself is mounted parallel to the back of the garage.

Figure 7:
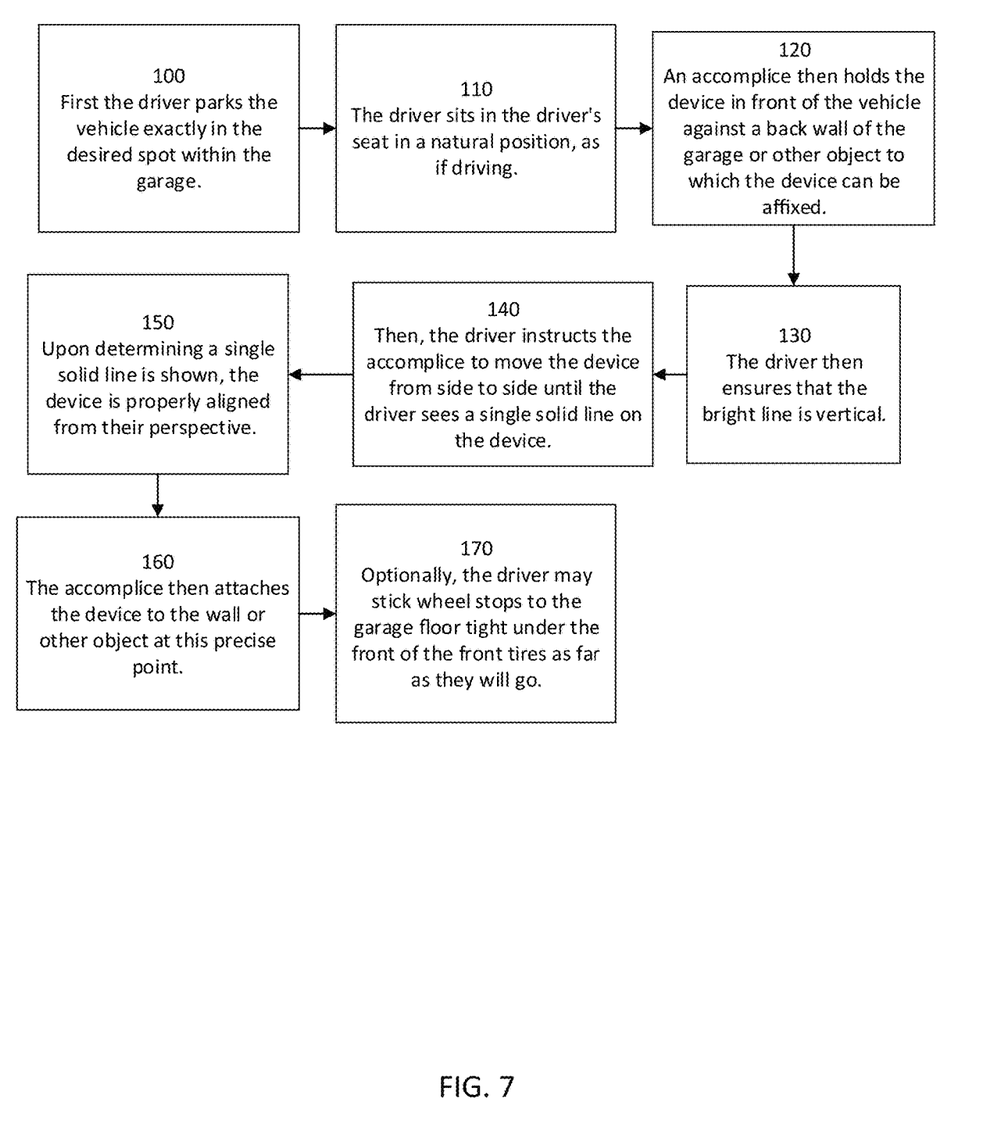
FIG. 7 depicts a flow chart of the process of installation and use of the device of the present invention by a user.

As outlined in FIG. 7, the process of installation and use of the apparatus of the present invention by a user is preferably as follows:

1. First the driver parks the vehicle exactly in the desired spot within the garage. (100)
2. The driver sits in the driver's seat in a natural position, as if driving. (110)
3. An accomplice then holds the device in front of the vehicle against a back wall of the garage or other object to which the device can be affixed. (120)
4. The driver then ensures that the bright line is vertical. (130) The location to which the device is affixed is parallel to the back wall of the garage, and is high enough that the driver can see it.
5. Then, the driver instructs the accomplice to move the device from side to side until the driver sees a single solid line on the device. (140)
6. Upon determining a single solid line is shown, the device is properly aligned from their perspective. (150)
7. The accomplice then attaches the device to the wall or other object at this precise point. (160)
8. Optionally, the driver may stick wheel stops to the garage floor tight under the front of the front tires as far as they will go. (170). This further cements the correct location for the driver to park.

It should be noted that alternate embodiments of the present invention may exhibit different colors, textures, and patterns depicted on the front panel (10) and/or rear panel (20). Further, alternate embodiments of the present invention may exhibit a longer or shorter point (20) than shown in FIG. 4.

Having illustrated the present invention, it should be understood that various adjustments and versions might be implemented without venturing away from the essence of the present invention. Further, it should be understood that the present invention is not solely limited to the invention as described in the embodiments above, but further comprises any and all embodiments within the scope of this application.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

I claim:

1. A passive, visual device to help a driver of a vehicle park the vehicle in the same spot in a garage repeatedly comprising:
    a first planar surface;
    a second planar surface, said second planar surface disposed behind said first planar surface such that the second planar surface is parallel to said first planar surface;
    wherein said first planar surface is separated from said second planar surface;
    wherein each said first planar surface and said second planar surface has a top surface;
    wherein said top surface of both said first planar surface and said second planar surface is a contrasting color; and
    wherein said top surface of said first planar surface is colored with a first stripe, running vertically and centrally across said top surface of said first planar surface;
    wherein said top surface of said first planar surface is colored with a second stripe, running vertically and centrally above a hole in said first planar surface;
    wherein said top surface of said second planar surface is colored with a third stripe, running vertically and centrally below said hole in said second planar surface;
    wherein said first stripe, said second stripe, and said third can be discerned by the driver when in view;
    further comprising columns, said columns joining said first planar surface and said second planar surface together such that said first stripe present on the top surface of the first planar surface and the third stripe disposed on the top surface of the second planar surface are aligned; and wherein said first stripe of said first planar surface, said second stripe of said first planar surface, and said third stripe of said second planar surface appear as one vertical line when viewed directly above.

2. The device of claim 1, wherein said hole is oriented such that said third stripe on said second planar surface can be seen through the hole.

3. The device of claim 2, wherein said first stripe of said first planar surface, said second stripe of said first planar surface, and said third stripe of said second planar surface appear as a single stripe when disposed at an eye level of the driver.

4. The device of claim 3, wherein the device is installed in alignment with a height of the driver when the device is disposed in front of the driver as they sit in their vehicle which has been parked in the garage in the spot.

5. A passive, visual device to help a vehicle driver park a vehicle in the same spot in a garage repeatedly comprising:
   a first planar surface;
   a second planar surface, said second planar surface disposed behind said first planar surface such that said second planar surface is parallel to said first planar surface;
   wherein said first planar surface is separated from said second planar surface;
   wherein each said first planar surface and said second planar surface has have a top surface;
   wherein said top surface of both said first planar surface and said second planar surface is a contrasting color;
   wherein said top surface of said first planar surface has a first stripe running vertically and centrally across said top surface above a hole in said first planar surface;
   wherein said top surface of said first planar surface has a second stripe running vertically and centrally across said top surface below said hole in said first planar surface;
   wherein said top surface of said second planar surface has a third stripe, running vertically and centrally across said top surface;
   further comprising columns, said columns joining said first planar surface and said second planar surface together such that said first stripe, said second stripe, and said third stripe are aligned when viewed directly above;
   wherein said first stripe, said second stripe, and said third stripe appear as a single stripe when disposed at an eye level of the driver.

6. The device of claim 5, wherein said hole is centrally disposed in a vertical orientation;
   wherein said hole is oriented such that said third stripe on said second planar surface can be easily seen through said hole.

* * * * *